(12) United States Patent
Renke et al.

(10) Patent No.: US 9,290,134 B2
(45) Date of Patent: Mar. 22, 2016

(54) COUPLING ASSEMBLY

(71) Applicant: GM GLOBAL TECHNOLOGY OPERATIONS LLC, Detroit, MI (US)

(72) Inventors: David T. Renke, Macomb, MI (US); Ronald Edward Chupick, Grosse Pointe Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 30 days.

(21) Appl. No.: 14/157,815

(22) Filed: Jan. 17, 2014

(65) Prior Publication Data

US 2015/0203054 A1    Jul. 23, 2015

(51) Int. Cl.
*B60R 13/02* (2006.01)
*B62D 27/02* (2006.01)
*F16B 5/06* (2006.01)

(52) U.S. Cl.
CPC ............ *B60R 13/0206* (2013.01); *B62D 27/02* (2013.01); *F16B 5/0664* (2013.01); *Y10T 24/309* (2015.01); *Y10T 29/49945* (2015.01)

(58) Field of Classification Search
CPC .... B60R 13/0206; B62D 27/06; B62D 27/04; B62D 27/02; F16B 5/0664

USPC .................. 296/181.2, 29, 191, 1.08; 24/297; 411/44, 80.1, 80.5, 502, 508
See application file for complete search history.

(56) References Cited

U.S. PATENT DOCUMENTS

| | | | |
|---|---|---|---|
| 7,267,385 B2* | 9/2007 | Williams et al. | .... B60R 13/0206 296/29 |
| 8,790,058 B2* | 7/2014 | Quaderer et al. | ............. 411/510 |
| 2006/0042053 A1* | 3/2006 | Kawai | ............... 24/297 |
| 2006/0198714 A1* | 9/2006 | Lesecq | ............... 411/44 |
| 2006/0214468 A1* | 9/2006 | Cass et al. | ................ 296/146.16 |
| 2007/0189875 A1* | 8/2007 | Ooyama et al. | ................. 411/45 |
| 2010/0088860 A1* | 4/2010 | Benedetti et al. | ............... 24/297 |
| 2012/0112494 A1* | 5/2012 | Kitayama et al. | ............. 296/202 |
| 2012/0240363 A1* | 9/2012 | Lee | ................................ 24/297 |

* cited by examiner

*Primary Examiner* — Jason S Morrow
(74) *Attorney, Agent, or Firm* — Quinn Law Group, PLLC

(57) ABSTRACT

A coupling assembly can couple first and second panels together. The second panel defines a panel hole. The coupling assembly includes a clip configured to be at least partially received in the panel hole. Moreover, the clip extending from the first panel and includes a clip body and at least one resilient leg extending from the clip body. The clip body extends along a longitudinal axis. The clip defines a clip hole extending into the clip body along the longitudinal axis. The coupling assembly further includes an insert comprising a polymer. The insert is at least partially disposed in the clip hole.

19 Claims, 3 Drawing Sheets

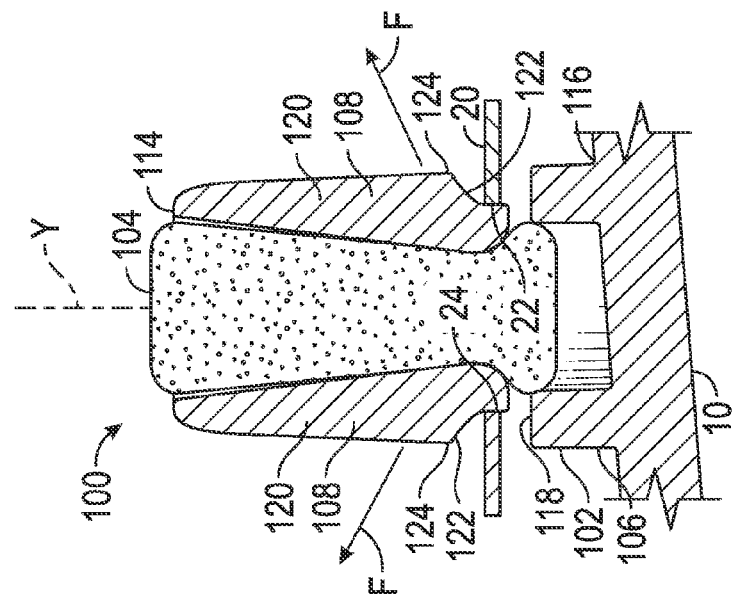
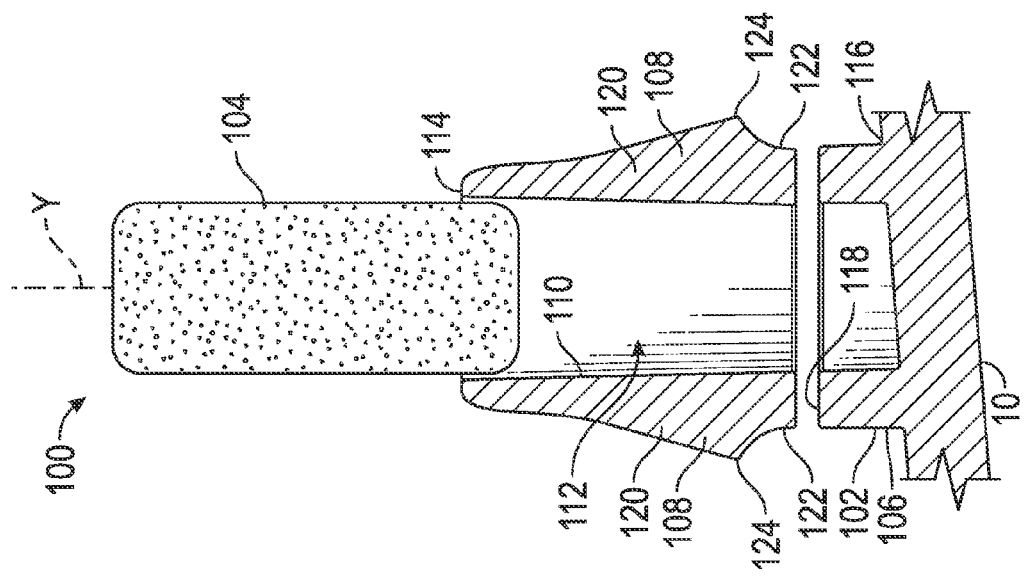

COUPLING ASSEMBLY

TECHNICAL FIELD

The present disclosure relates to a coupling assembly for coupling panels together.

BACKGROUND

It is sometimes useful to couple panels together during a manufacturing process. For example, in a process to assemble a vehicle body, it may be necessary to couple two panels together. To do so, it is useful to employ a coupling assembly capable of coupling at least two panels together.

SUMMARY

As discussed above, it is sometimes useful to couple two panels together using a coupling assembly. The coupling assembly should be sufficiently rigid and sturdy to maintain the two panels connected to each other. It also useful to minimize the weight and cost of the coupling assembly. To do so, the coupling assembly may include an insert at least partially made of a polymer and capable of enhancing the structural integrity of the coupling assembly.

In an embodiment, the coupling assembly can couple first and second panels together. The second panel defines a panel hole. The coupling assembly includes a clip configured to be at least partially received in the panel hole. Moreover, the clip extends from the first panel and includes a clip body and at least one resilient leg extending from the clip body. The clip body extends along a longitudinal axis and defines a clip hole extending into the clip body along the longitudinal axis. The coupling assembly further includes an insert wholly or partly made of a polymer. The insert is at least partially disposed in the clip hole.

The present disclosure also relates to vehicle bodies. In an embodiment, the vehicle body includes a first panel, a second panel defining a panel hole, and a coupling assembly as described above. The coupling assembly can couple the first and second panels together.

The present disclosure also relates to a coupling method. In an embodiment, the coupling method may include the following steps: a) providing a first panel; b) providing a second panel defining a panel hole; b) providing a coupling assembly as described above; c) inserting the insert of the coupling assembly into the clip hole defined by the clip; and d) inserting the clip and the insert through the panel hole of the second panel in order to couple the first panel to the second panel.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 3 is a schematic, cross-sectional view of the coupling assembly shown in FIG. 1, showing the insert being inserted into the clip; and FIG. 4 is a schematic, cross-sectional view of the coupling assembly shown in FIG. 1, showing the insert partially disposed inside the clip.

DETAILED DESCRIPTION

Figure 1:
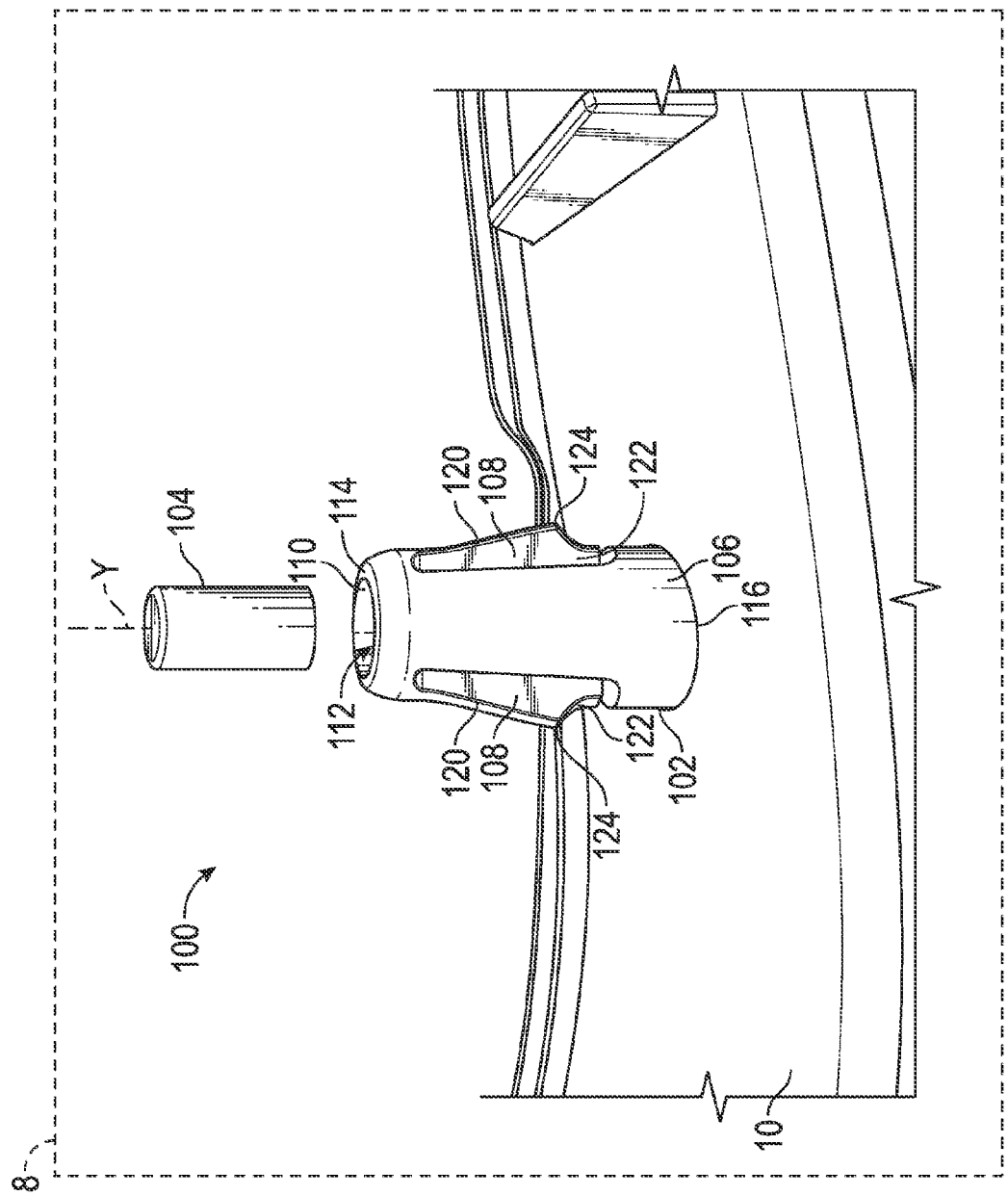
FIG. 1 is a schematic, perspective, exploded view of a coupling assembly including a clip and an insert.
Figure 2:
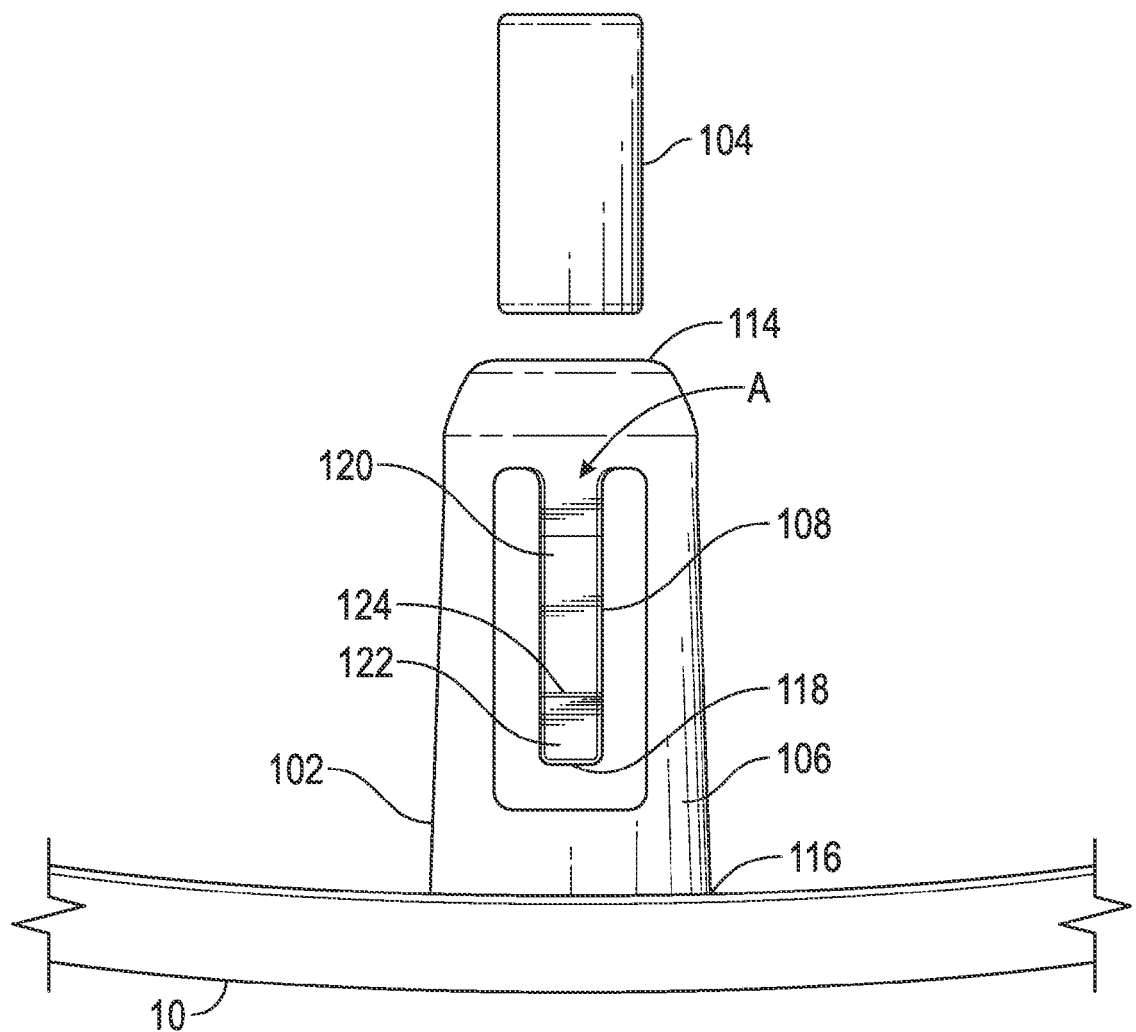
FIG. 2 is a schematic, side, exploded view of the coupling assembly of FIG. 1.

Referring to the drawings, wherein like reference numbers correspond to like or similar components throughout the several figures, FIGS. 1 and 2 schematically illustrate a coupling assembly 100 for coupling two panels 10, 20 together (see panel 20 in FIG. 4). The coupling assembly 100, and the two panels 10, 20 may be part of a vehicle body 8.

The coupling assembly 100 includes a clip 102 attached to the first panel 10 and an insert 104 configured, shaped, and sized to be at least partially disposed inside the clip 102. The clip 102 may be monolithically formed with the first panel 10. As such, the clip 102 and the first panel 10 collectively form a one-piece structure. For instance, the clip 102 and the first panel 10 may be formed using any suitable molding process. Alternatively, the clip 102 and the first panel 10 may be discrete interconnected components. The first panel 10 and the clip 102 may both be wholly or partly made of a substantially rigid material such as a rigid polymer. As a non-limiting example, a suitable rigid polymer for the first panel 10 and clip 102 may be polypropylene.

The clip 102 may have a substantially cylindrical shape and includes a clip body 106 and at least one resilient leg 108 movably coupled to the clip body 106. The clip 102 extends along a longitudinal axis Y and may be made of a substantially rigid material, such as a rigid polymer. The clip 102 defines an inner body surface 110 (see also FIG. 3). The inner body surface 110 in turn defines a clip hole 112 (see also FIG. 3) extending along the longitudinal axis Y. Accordingly, the clip 102 defines the clip hole 112. The clip hole 112 extends into the clip body 106 along the longitudinal axis Y. The clip body 106 defines a first body edge 114 and a second body edge 116 opposite the first body edge 114. In the depicted embodiment, the clip body 106 is coupled to the first panel 10 at the second body edge 116, and the first body edge 114 is spaced apart from the first panel 10 along the longitudinal axis Y.

With specific reference to FIG. 2, the clip 102 defines at least one substantially U-shaped opening 118 per resilient leg 108. Thus, the number of U-shaped openings 118 corresponds to the number of resilient legs 108. As a non-limiting example, the clip 102 may include two resilient legs 108 and two U-shaped openings 118. Each U-shaped opening 118 is disposed around one resilient leg 108 and is in communication with the clip hole 112 (FIG. 3). Each leg 108 is coupled to the clip body 106 at a location A that is closer to the first body edge 114 than to the second body edge 116. In the depicted embodiment, each clip 102 is coupled to the clip body 106 only at the location A. The U-shaped opening 118 disposed around the resilient leg 108 allows the resilient leg 108 to move inwardly (i.e., toward the clip hole 112 (FIG. 1)) or outwardly (i.e., away from the clip hole 112). As also shown in FIG. 1, each resilient leg 108 includes a ramp 120 and a recessed surface 122. The ramp 120 and the recessed surface 122 intersect at a central edge 124 of the resilient leg 108. The recessed surface 122 may be substantially concave.

With reference to FIGS. 3 and 4, the coupling assembly 100 can couple the first and second panels 10, 20 together as described in detail below. The second panel 20 defines an inner panel surface 22 (FIG. 4). The inner panel surface 22 defines a panel hole 24 (FIG. 4) configured, shaped, and sized to receive at least a portion of the clip 102. The panel hole 24 may be circular or any other suitable shape.

The coupling assembly 100 further includes a solid insert 104 configured, shaped, and sized to be at least partially disposed in the clip hole 112. The insert 104 may be substantially cylindrical and is wholly or partly made of a substantially rigid material, such as a rigid polymer. Although the drawings depict a cylindrical insert 104, the insert 104 may also have other suitable shapes. The shape of the insert 104 may correspond to the shape of the clip hole 112. As a non-limiting example, the insert 104 may be entirely or partially made of a solid foam or foam rubber. The insert 104, for example, may be wholly or partly made of polyurethane, ethylene propylene diene monomer (EPDM) rubber, or any other suitable polymer in order to minimize cost and weight. Regardless of the specific material employed, the insert 104 is wholly or partially made of a material that is sufficiently rigid to urge the resilient legs 108 in a direction away from the clip hole 112 (i.e., a radially outward direction) when the insert 104 is at least partially disposed in the clip hole 112. The insert 104 may be color coded to indicate different materials or rigidity. The insert 104 is made of a substantially rigid material, such as a rigid polymer, in order to urge the resilient legs 108 radially outwardly when the insert 104 is disposed in the clip hole 112. As a consequence, the resilient legs 108 can firmly contact the second panel 20 in order to couple the first panel 10 to the second panel 20 via the coupling assembly 100.

To couple the first panel 10 to the second panel 20, the insert 104 is at least partially positioned in the clip hole 112 such that the majority of the insert 104 is disposed in the clip hole 112. Then, the clip 102 and the insert 104, which is at least partially disposed in the clip hole 112, are inserted and advanced through the panel hole 24 of the second panel 20 until the inner panel surface 22 surrounds the recessed surface 122 of the legs 108. When the clip body 106 is advanced through the panel hole 24, the inner panel surface 22 can slide along the ramps 120 of the resilient legs 108 and thereby push the resilient legs 108 inwardly (i.e., toward the clip hole 112). However, the legs 108 are resilient and therefore exert a radially outward force F when the inner panel surface 22 is sliding along the ramps 120. Further advancement of the clip 102 through the panel hole 24 eventually causes the inner panel surface 22 to be disposed adjacent the recessed surface 122. When the inner panel surface 22 surrounds the recessed surface 122 of the legs 108, the coupling assembly 100 couples the first panel 10 to the second panel 20. The insert 104 enhances the structural integrity of the clip 102 by exerting a radially outward force on the resilient legs 108, thereby inhibiting the legs 108 from moving inwardly (i.e., toward the clip hole 112). In summary, a coupling method using the coupling assembly 100 may include the following steps: a) providing the first panel 10 as shown in FIG. 1; b) providing the second panel 20 that defines a panel hole 24 as shown in FIG. 4; c) providing the coupling assembly 100 as shown in FIG. 2; d) inserting the insert 104 in the clip hole 112 as shown in FIG. 3; and e) inserting and advancing the clip 102 and the insert 104 through the panel hole 24 of the second panel 20 until the inner panel surface 22 surrounds the recessed surfaces 122 of the resilient legs 108 (as shown in FIG. 4) in order to couple the first panel 10 to the second panel 20. At this point, the insert 104 may be compressed by the resilient legs 108 due to the inward force exerted by the second panel 20 on the resilient legs 108.

To decouple the first panel 10 from the second panel 20, the insert 104 may be first removed from the clip hole 112. Then, the resilient legs 108 can be pushed inwardly (i.e., toward the clip hole 112). While pushing the legs 108 inwardly, the clip 102 may be removed from the panel hole 24 in order to decouple the first panel 10 from the second panel 20.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A coupling assembly for coupling first and second panels together, the second panel defining a panel hole, the coupling assembly comprising:
    a clip configured to be at least partially received in the panel hole, the clip extending from the first panel, wherein the clip includes a clip body and at least one resilient leg extending from the clip body, the clip body extending along a longitudinal axis, the clip defining a clip hole extending into the clip body along the longitudinal axis, and the clip hole has a cylindrical shape when the clip is disposed outside the panel hole; and
    an insert comprising a polymer, wherein the insert is at least partially disposed in the clip hole, and the at least one resilient leg is bent inwardly toward the longitudinal axis when the clip is disposed in the panel hole such that the at least one resilient leg compresses the insert.

2. The coupling assembly of claim 1, wherein the insert is at least partially made of foam.

3. The coupling assembly of claim 1, wherein the insert is at least partially made of foam rubber.

4. The coupling assembly of claim 1, wherein the insert is at least partly made of an ethylene propylene diene monomer rubber.

5. The coupling assembly of claim 1, wherein the clip body has a cylindrical shape.

6. The coupling assembly of claim 1, wherein the clip is monolithically formed with the first panel.

7. The coupling assembly of claim 1, wherein the clip body includes a first body edge and a second body edge opposite the first body edge, and the at least one resilient leg is attached to the clip body only at a location that is closer to the first body edge than to the second body edge.

8. The coupling assembly of claim 1, wherein the insert has a cylindrical shape when the clip is disposed outside the panel hole.

9. The coupling assembly of claim 1, wherein at least one resilient leg includes a ramp and a recessed surface, and the ramp and the recessed surface intersect at a central edge.

10. A vehicle body, comprising:
    a first panel;
    a second panel defining a panel hole;
    a coupling assembly, wherein the coupling assembly includes:
        a clip at least partially received in the panel hole, the clip extending from the first panel, wherein the clip includes:
            a clip body extending along a longitudinal axis, wherein the clip defines a clip hole extending into the clip body along the longitudinal axis, and the clip hole has a cylindrical shape when the clip is disposed outside the panel hole;
            at least one resilient leg extending from the clip body; and
        an insert comprising a polymer, wherein the insert is at least partially disposed in the clip hole, and the at least one resilient leg is bent inwardly toward the longitudinal axis such that the at least one resilient leg compresses the insert.

11. The vehicle body of claim 10, wherein the insert is at least partially made of foam.

12. The vehicle body of claim 10, wherein the insert is at least partially made of foam rubber.

13. The vehicle body of claim 10, wherein the insert is at least partly made of an ethylene propylene diene monomer rubber.

14. The vehicle body of claim 10, wherein at least one resilient leg includes a ramp and a recessed surface, and the ramp and the recessed surface intersect at a central edge.

15. The vehicle body of claim 10, wherein the clip body is monolithically formed with the first panel.

16. The vehicle body of claim 10, wherein the clip body includes a first body edge and a second body edge opposite the first body edge, and the at least one resilient leg is attached to the clip body only at a location that is closer to the first body edge than to the second body edge.

17. The vehicle body of claim 16, wherein the clip further defines a U-shaped opening disposed around the at least one resilient leg.

18. The vehicle body of claim 17, wherein the U-shaped opening is in communication with the clip hole.

19. A coupling method, comprising:

providing a first panel;

providing a second panel defining a panel hole;

providing a coupling assembly, wherein the coupling assembly includes a clip extending from the first panel and an insert at least partly made of a polymer, the clip includes a clip body and a plurality of resilient legs extending from the clip body, the clip body extending along a longitudinal axis, the clip defining a clip hole extending into the clip body along the longitudinal axis, and the clip hole has a cylindrical shape when the clip is disposed outside the panel hole;

inserting the insert into the clip hole; and after inserting the insert in the clip hole, inserting the clip and the insert through the panel hole until the resilient legs move inwardly toward the longitudinal axis and compress the insert.

* * * * *